US008339363B2

(12) United States Patent  
Krum et al.

(10) Patent No.: US 8,339,363 B2  
(45) Date of Patent: Dec. 25, 2012

(54) SENSOR-INITIATED EXCHANGE OF INFORMATION BETWEEN DEVICES

(75) Inventors: David Michael Krum, Palo Alto, CA (US); Hauke Schmidt, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 1058 days.

(21) Appl. No.: 11/128,548

(22) Filed: May 13, 2005

(65) Prior Publication Data

US 2006/0256074 A1    Nov. 16, 2006

(51) Int. Cl.
*G06F 3/033* (2006.01)
*G09G 5/08* (2006.01)

(52) U.S. Cl. ...................................................... 345/158

(58) Field of Classification Search .......... 345/156–184; 715/856–864
See application file for complete search history.

(56) References Cited

U.S. PATENT DOCUMENTS

| | | | |
|---|---|---|---|
| 2002/0145596 A1* | 10/2002 | Vardi ............................ | 345/179 |
| 2003/0132974 A1 | 7/2003 | Bodin | |
| 2004/0139217 A1* | 7/2004 | Kidney et al. ................. | 709/232 |
| 2005/0093868 A1* | 5/2005 | Hinckley ..................... | 345/502 |
| 2005/0212753 A1* | 9/2005 | Marvit et al. ................. | 345/156 |
| 2005/0219223 A1* | 10/2005 | Kotzin et al. ................. | 345/173 |

OTHER PUBLICATIONS

Hinkley, K., Synchronous gestures for multiple persons and computers, 2003, Microsoft Research, vol. 5, Issue 2.
Hinkley, K. et al., Stitching: pen gestures that span multiple displays, Oct. 6, 2003, Microsoft Research, Submitted to CHI 2004.
Hinkley, K. et al., Sensing techniques for mobile interaction, 2000, CHI Letters, vol. 2,2.
Holmquist, L. E. et al., Smart-Its friends: a technique for users to easily establish connections between smart artefacts, Ubicomp 2001.
Harrison, B. L. et al., Squeeze me, hold me, tilt me! An exploration of manipulative user interfaces, Apr. 18, 1998, CHI '98.
Rekimoto, J., Tilting operations for small screen interfaces, 1996, ACM, UIST '96.
Verplaetse, C., Inertial proprioceptive devices: self-motion-sensing toys and tools, 1996, IBM Systems Journal, vol. 35, Nos. 3 & 4.

* cited by examiner

*Primary Examiner* — Chanh Nguyen
*Assistant Examiner* — Long D Pham
(74) *Attorney, Agent, or Firm* — Dergosits & Noah LLP; Geoffrey T. Staniford

(57) ABSTRACT

Information exchange systems and methods ("IES") are described that allow users of portable devices to initiate exchanges of information with a simple gesture. Detection of this gesture causes the host device to perform a number of actions including one or more of selecting data for an exchange transaction, identifying one or more destination devices to receive the selected data, transferring the selected data to the destination devices, and receiving complementary or corresponding data from the destination devices. The IES thus avoids the requirement for users to perform time consuming and error prone interactions involving complex operations with a device interface in order to initiate data exchanges.

15 Claims, 3 Drawing Sheets

SENSOR-INITIATED EXCHANGE OF INFORMATION BETWEEN DEVICES

TECHNICAL FIELD

The disclosure herein relates generally to user interfaces and, more particularly, to sensor-based control of processor-based devices.

BACKGROUND

Portable client devices are rapidly becoming more complex as they incorporate new functions. For example, some personal digital assistants ("PDA") and cellular telephones now include cameras, music players, and even Global Positioning System ("GPS") navigation in addition to traditional calendar and contact management capabilities. These new functions have led to increases in storage capacity or memory in the portable devices so as to allow the devices to store larger numbers and types of data files. These new functions and memory capacities however have made it more difficult for users to interact with portable devices because of the requirement to navigate larger, more complex menu sets as well as larger and more diverse file collections.

This current generation of consumer devices supports information exchanges with other devices, often in the form of contact records, through infrared and radio frequency communication for example. This capability allows users to share information with other users. However, the combination of the increased storage capability and the complexity of device menus also increased the complexity of locating and selecting data in a device and initiating data transfers.

Sharing or exchanging data among portable devices is challenging because it involves both selection of data for transfer as well as the selection and configuration of a data transmission function. Conventional portable devices initiate data exchanges using a number of methods.

Some portable devices exchange information using infrared light. When users of theses devices exchange information via an infrared system, the users must align the infrared ports of two devices. One user must navigate to the information to be sent, and then select an option for sending the information by infrared. If the additional user also wishes to send information, the same type of interaction is required. Some portable devices streamline this exchange procedure by allowing the users to select and send a predetermined contact record by pressing and holding a particular button of their device.

Portable devices also support information transfers using radio frequency ("RF") communication protocols. While this avoids any requirement for alignment of the devices, the users must navigate to the information to be sent, and select an option for sending the data as with an infrared transfer. Furthermore, each user must correctly select the intended destination device from a list of nearby devices. Additionally, some portable devices must be "paired" to allow information exchange, where pairing requires that each device be given a matching passkey code.

While the typical portable devices allow for the exchange of information with other portable devices, the data exchange methods used are considered by many to be quite cumbersome in terms of the amount of user interaction required to initiate/execute an exchange. While research has been done on less cumbersome device interaction methods that use information of sensors in the execution of a data exchange, this research has not fully addressed selection of data for exchange, selection of exchange participants, and coordination of exchanges between devices to name a few.

Figure 1:
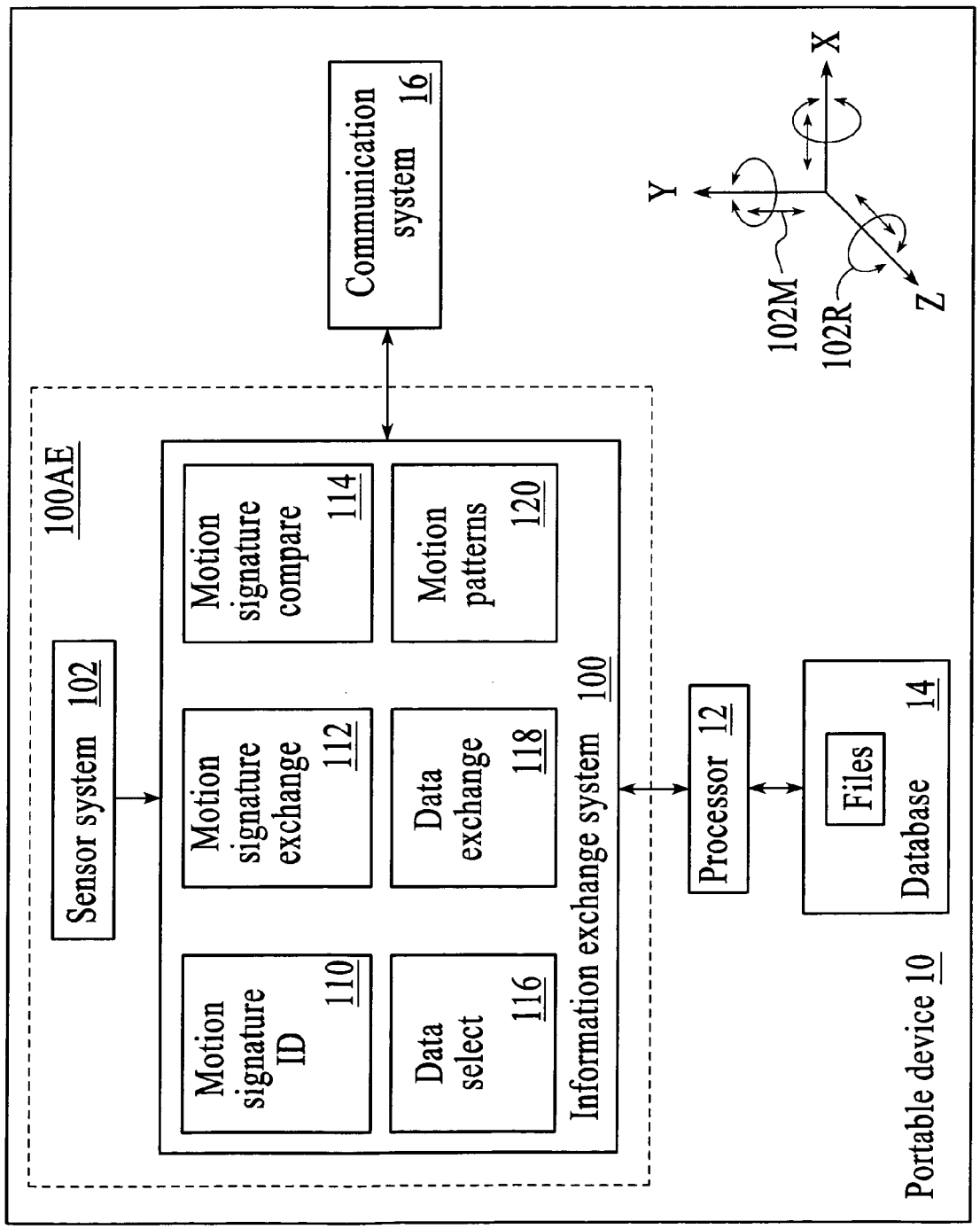
FIG. 1 is a block diagram of a portable client device that includes an "Information Exchange System ("IES")", under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Information exchange systems and methods are described below that use sensors to detect and infer information about a user's desire to exchange information or data with other users via portable client devices (alternatively referred to as "portable devices", "host devices", and "devices"). The information exchange systems and methods, collectively referred to herein as "Information Exchange Systems ("IES")", generally use accelerometers and wireless networking to automatically initiate data exchanges between two devices moved through matching gestures or motions. The term "match" or "matching" is used herein to include matching, correlative, complementary, and/or corresponding motion or movement of two devices. When a host device detects self-movement, the device determines if the movement is of a type that indicates the user wishes to exchange information. In response to a determination that the user wishes to exchange data with the user of another portable device, the host device then wirelessly searches for one or more local devices having matching movement.

When the host device identifies other devices that have detected matching gestures or motion, the host device selects information for exchange based on the type of self-detected gesture/motion and begins transfer of the selected information to those identified devices. The gestures generally include a time-varying position expressed as a unique pattern of movement over an interval of time. A variety of gestures can be defined using any number of different and repeatable patterns of movement expressed over an interval of time and mapped to one or more device functions (e.g., initiating data exchange). The matching movements can include being struck together, being moved in gestures that simulate any number of activities (e.g., throwing and catching), and being tapped some number of times in accordance with a particular rhythm or pattern. These and other related techniques are referred to herein as "bluebumping" or "bluebumping transactions", and devices that are participants in bluebumping are referred to herein as "bluebump partners". Bluebumping can be quickly performed and resonates with human social practices such as handshakes and the clinking together of beverage glasses to name a few.

Bluebumping may be considered a synchronous gesture. Synchronous gestures include patterns of activity spanning a distributed system (contributed by multiple users or a single user with multiple devices), which take on a new meaning when occurring together in time, or in a specific sequence in time. The motion patterns of bluebumping therefore may include patterns that occur in parallel, in exact synchrony, in one or more pre-specified sequences, and/or partially overlapping patterns. Consequently, bluebumping includes motion for which complementary portions of a motion pattern or signal are contributed by different portable devices, and the motion pattern is recognized when the complementary patterns are brought together.

Consequently, the IES allows users of portable devices to initiate exchanges of information with a simple gesture. Detection of this gesture causes the host device to perform a number of actions including, but not limited to, selecting data for an exchange transaction, identifying one or more destination devices to receive the selected data, transferring the selected data to the destination devices, and receiving complementary or corresponding data from the destination devices. The IES supports simultaneous exchanges of data between two or more portable devices. Use of the IES thus avoids the requirement for users to perform time consuming and error prone interactions involving complex operations with a device interface in order to initiate data exchanges.

One example of IES operation includes the exchange of contact information between two cellular telephones. The exchange commences when the IES detects predetermined motion or movement patterns that occur simultaneously or sequentially on two or more cellular telephones in a local area. In addition to identifying at least one bluebump partner device with which the host device will exchange information, the IES uses information of the detected motion patterns (e.g., type, duration, synchronicity, etc.) to determine what contact information will be exchanged. A simultaneous pattern example may include two cellular telephone users trading cellular telephone numbers by tapping their cellular telephones together. A sequential pattern example may include one cellular telephone user moving her telephone in a simulated throwing gesture while a second cellular telephone user moves his telephone in a simulated catching gesture to trade workplace phone numbers.

In the following description, numerous specific details are introduced to provide a thorough understanding of, and enabling description for, embodiments of the IES. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of a portable client device 10 that includes the "Information Exchange System ("IES")" 100, under an embodiment. The IES 100 is coupled to a sensor system 102, but is not so limited, and the sensor system 102 along with the perception methods of the IES 100 are integrated to facilitate autonomous awareness of a user's desire to initiate a data transaction with another user/device via the client device 10. The IES 100 also couples to at least one processor 12, at least one database 14, and one or more components of a communication system 16 of the portable device 10.

The sensor system 102 includes one or more sensors (not shown) for use in sensing or detecting motion and/or rotation of the portable device 10. As such, the portable device 10 is a self-motion-sensing device that monitors its motions and responds to the motions as described herein. The sensors may include accelerometers, gyroscopes or other rate sensors, and/or inclinometers for example, but are not so limited. The sensors detect gestures involving motion 102M and/or rotation 102R about and/or along any combination of the orthogonal axes X, Y, Z of the portable device 10. Information from the sensor system 102 is provided to the IES 100 via one or more couplings with the IES 100.

The sensors of an embodiment include one or more accelerometers, but the embodiment is not so limited, as any number of accelerometers can be used alone or in combination with any number and/or type of other sensor. The accelerometers generally sense and respond to translational accelerations of the portable device 10. A first integration of the accelerometer output with respect to time provides velocity information, and a second integration of the output provides position information. The sensors may use accelerometers under any variety of technologies, including piezoelectric, piezoresistive, and capacitive accelerometers to name a few.

The communication system 16 may be a communication system by which the portable device 10 completes all information transfers or, alternatively, a communication system dedicated to the IES 100. The communication system 16 includes at least one of a transmitter and a receiver (not shown) as appropriate to the communication protocols used by the portable device 10 and/or the IES 100. For example, the portable device 10 may include wireless devices like cellular telephones and other mobile communication devices, personal digital assistants ("PDA"), personal information managers ("PIM"), personal computers ("PC"), pagers, watches, but are not so limited. The portable device 10 may include all such devices and equivalents, and are not limited to communication devices that are wireless.

The portable device 10 communicates using the communication system 16 via at least one wireless network (not shown) that includes various network components of a communication service provider or carrier, but is not so limited. Further, the wireless network and corresponding network components can be any of a number of network types known in the art including, but not limited to, local area networks (LANs), metropolitan area networks (MANs), wide area networks (WANs), proprietary networks, backend networks, and the Internet.

The IES 100 of an alternative embodiment 100AE may include the sensor system 102. The IES 100 of another alternative embodiment may include the communication system 16. The IES 100 of yet another alternative embodiment may include the sensor system 102 and the communication system 16.

The IES 100 includes motion signature (or pattern) identification ("ID") 110, motion signature exchange 112, motion signature compare 114, data select 116, and data exchange 118 "components", but is not so limited. The IES 100 further includes motion signatures 120, which may be stored in the database 14. While the term "components" is generally used herein, it is understood that "components" include circuitry, components, modules, and/or any combination of circuitry, components, and/or modules as the terms are known in the art. While the components are shown as co-located, the embodiment is not to be so limited; the IES of various alternative embodiments may distribute one or more functions provided by the components 110-120 among any number and/or type of components, modules, and/or circuitry of the host portable device 10.

The IES 100 uses the components 110-120 to process information from the sensors in order to self-initiate information exchanges. For example, the motion signature ID component 110 analyzes sensor data in order to identify or correlate a detected pattern or signal of sensed device motion with a motion signature 120. This identification is performed using a comparison of the signal generated by motion of the host device 10 over some interval of time with information of pre-specified motion signatures 120 stored on the host device 10. The type of sensor signal is as appropriate to the sensors of the sensor system 102. The motion signatures 120 include motion pattern or signal information representing device motions that indicate a desire by a user to initiate a data exchange or participate in other types of bluebump transactions with other portable devices in a vicinity of the host device 10. The host device 10 may include any number and/or type of motion signatures 120 as appropriate to the device and the user, and the motion signatures 120 may be updateable. The motion signatures 120 may be stored in a catalog or other group format but are not so limited.

The motion signature exchange component 112 is coupled to use the communication system 16 in order to exchange or transfer identified motion signatures with other local devices in a vicinity of the host device 10. The motion signature compare component 114 compares motion signatures received during a motion signature exchange and identifies any received motion signatures that match the detected motion signature of the host device 10. The comparison of motion signatures may include analysis of sensor signal components including but not limited to frequency, amplitude, timing, alignment, rate, etc., where the analysis may include any number and/or combination of conventional signal processing/analysis techniques. Any devices in the vicinity of the host device 10 from which matching motion signatures are received are thus identified as bluebump partners by the host device 10.

The data select component 116 uses information of the identified motion signature to select data for an exchange transaction with identified bluebump partner devices. The selected data is stored at the host device 10; alternative embodiments may identify and retrieve selected data from other data storage devices in the vicinity of the host device 10. The data exchange component 118 automatically initiates exchange of the selected data between the host device 10 and identified bluebump partner devices. The data exchange is executed via the communication system 16.

The IES 100, while recognizing pre-specified motion signatures, also recognizes and filters naturally occurring motion patterns not intended by a user to initiate bluebumping transactions. Given natural variations in user performance, and between performances of different users, the IES is flexible enough to reliably detect intentional user action intended to initiate bluebump transactions from naturally occurring motion patterns (e.g., dropping, handling, shaking, etc.) typical to everyday use of portable devices.

The actual configuration of the IES 100 is as appropriate to the components, configuration, functionality, and/or form-factor of a host portable device; the couplings shown between the IES 100 and components of the portable device 10 therefore are representative only and are not to limit the IES 100 and/or the portable device 10 to the configuration shown. The IES 100 can be implemented in any combination of software algorithm(s), firmware, and hardware running on one or more processors, where the software can be stored on any suitable computer-readable medium, such as microcode stored in a semiconductor chip, on a computer-readable disk, or downloaded from a server and stored locally at the host device for example.

The IES 100 and sensor system 102 of the portable device 10 may couple among the processor 12, the database 14, and the communication system 16 under program or algorithmic control. The database 14 may include any number, type, and/or combination of memory devices, including read-only memory ("ROM") and random access memory ("RAM"), but is not so limited. Alternatively, various other components of the portable device 10 can couple among the IES 100, sensor system 102, processor 12, and various other components of the portable device 10 to provide self-initiated data exchanges. These other components may include various processors, memory devices, buses, controllers, input/output devices, and displays to name a few.

While one processor 12, one database 14, and one communication system 16 are shown, various alternative embodiments include any number and/or type of each of these components coupled in various configurations known in the art. Further, while the IES 100, sensor system 102, processor 12, database 14, and communication system 16 are shown as separate blocks, some or all of these blocks can be monolithically integrated onto a single chip, distributed among a number of chips or components of a host system, and/or provided by some combination of algorithms. The term "processor" as generally used herein refers to any logic processing unit, such as one or more CPUs, digital signal processors ("DSP"), application-specific integrated circuits ("ASIC"), etc.

Figure 2:
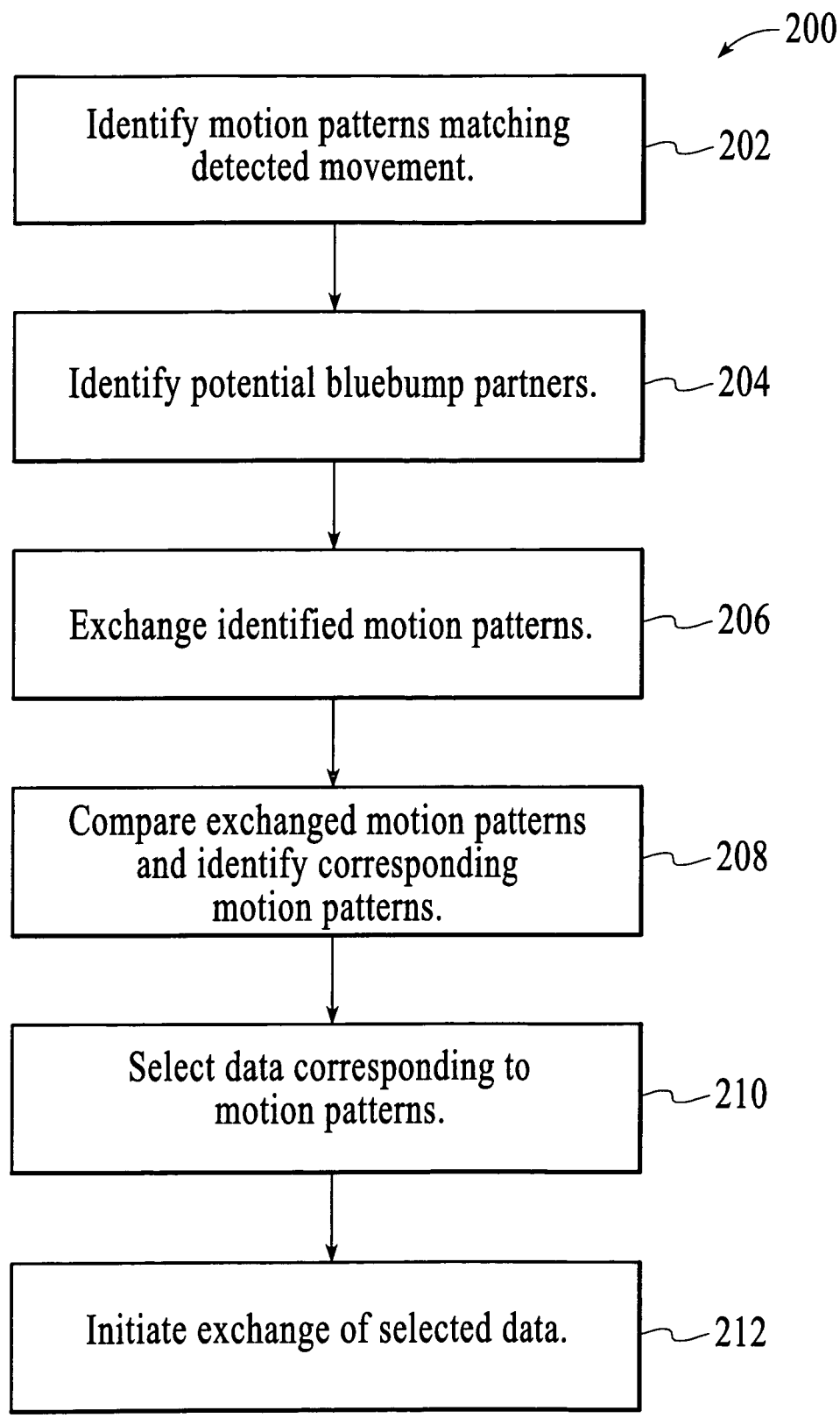
FIG. 2 is a flow diagram for automatically initiating data exchanges using the IES, under an embodiment.

As an example of an IES self-initiated data exchange, FIG. 2 is a flow diagram 200 for automatically initiating data exchanges using the IES 100, under an embodiment. The IES receives information from at least one sensor of a host device and, using the sensor information, detects motion of the host device. The IES compares information of the detected motion with information of the stored motion patterns and identifies 202 motion patterns that match or correspond to the detected motion. Upon identifying a motion pattern that matches the detected device motion, the IES determines that the user may be initiating or participating in bluebumping and thus attempts to identify or locate 204 other portable devices that are local to the host device and which may be bluebump partners. Portable devices "local" to the host devices are those devices that are accessible to and capable of communicating with the host device as appropriate to a configuration of the service provider network(s) and communication protocol(s) of the devices.

When one or more other portable devices are located 204 in the vicinity of the host device, the IES exchanges 206 information of the identified motion patterns with these identified local devices. The exchange 206 can include transmitting a "motion signature" to the local devices and/or receiving a motion signature from the local devices. The motion signature of an embodiment includes at least one of timing information (e.g., timestamp) and a description corresponding to the detected motion and/or the matching motion pattern, but may include any type/combination of other information. The IES compares 208 motion pattern information received during the exchange 206 and identifies 208 any matches between the motion of the host device and the motion of any local devices. Using information of the identified matches 208, the IES identifies local devices originating the matching motion patterns as bluebump partners.

The IES further selects 210 data for exchange or transfer between bluebump partners using information of the motion signature. The selected data is selected 210 from among the data files stored in one or more memory areas or devices of the host device. The IES automatically initiates exchange 212 of the selected data with any number of the identified bluebump partners. The exchange 212 can include transmitting selected data to and/or receiving corresponding or complementary data from the bluebump partners.

Figure 3:
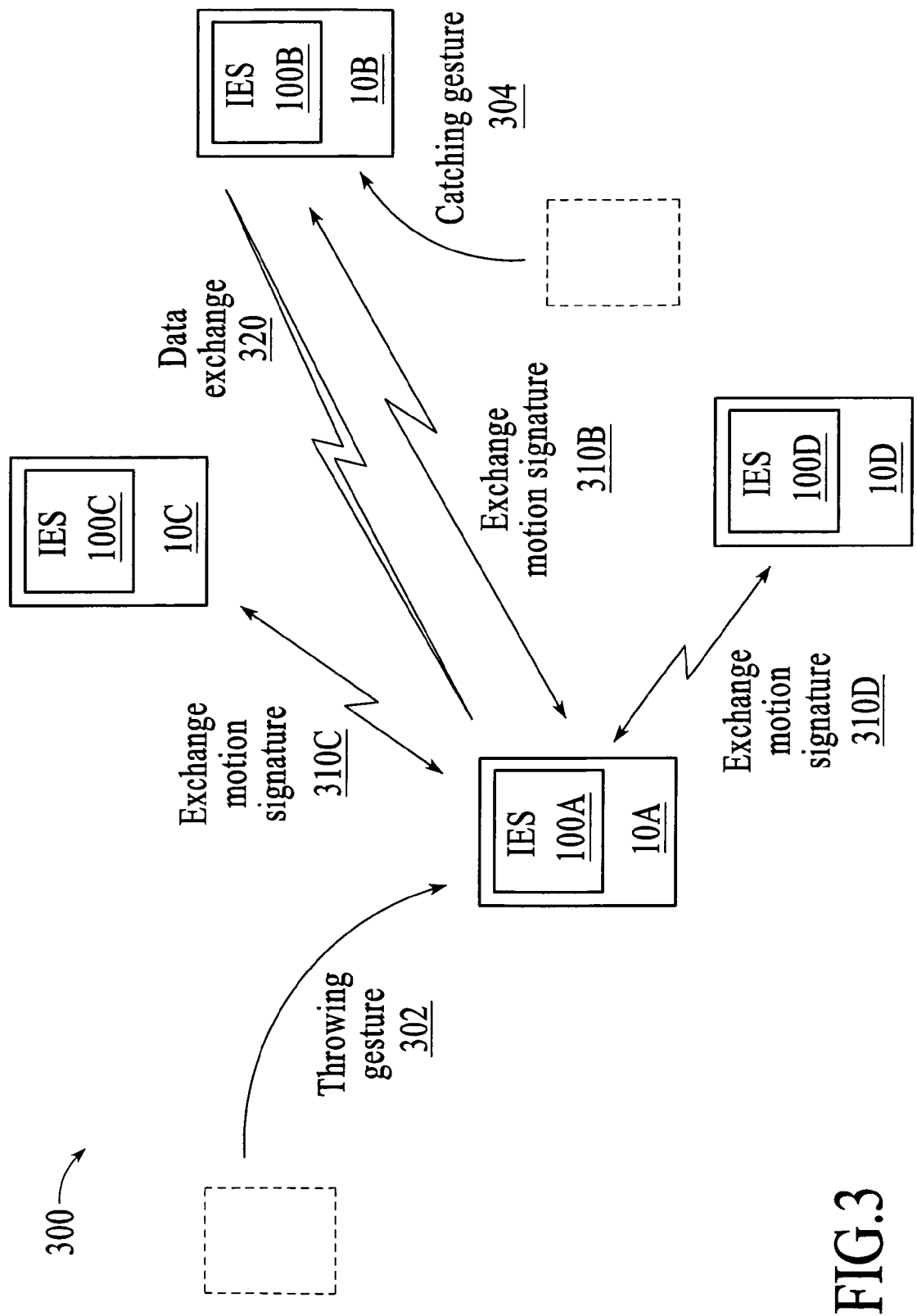
FIG. 3 is a block diagram of a bluebump transaction, under an embodiment.

An example of IES operation includes the exchange of contact information between two client devices, as described above. FIG. 3 is a block diagram of a bluebump transaction 300, under an embodiment. The bluebump transaction 300 of this example assumes the user of portable device 10A desires to exchange contact information with the user of portable device 10B; portable devices 10A and 10B are in a local area in which other portable devices 10C and 10D are present. The local area is such that portable devices 10A-10D can communicate wirelessly with one another, but the embodiment is not necessarily so limited. The portable devices 10A-10D of this example each include an IES 100 (IES 100A-100D, respectively) operating as described above with reference to FIGS. 1 and 2, but are not so limited.

This example includes a sequential pattern exchange in which the user of one client device 10A moves her client device 10A in a simulated throwing gesture 302 while a user of a second client device 10B moves his client device 10B in a simulated catching gesture 304. The information exchange commences when the IES 100A detects predetermined motion or movement patterns that occur simultaneously or sequentially on devices 10A and 10B.

In operation, the IES 100A receives information from at least one sensor (not shown) of host device 10A and, using the sensor information, detects motion 302 of the host device 10A. The IES 100A compares information of the detected motion 302 with information of the stored motion patterns and identifies the motion pattern as a throwing gesture 302. The IES 100A determines from the throwing gesture 302 that the user is initiating a bluebump transaction and thus attempts to identify or locate other portable devices in the vicinity of the host device (local devices) that may be bluebump partners.

In attempting to locate bluebump partners, the IES 100A exchanges motion pattern information 310B, 310C, 310D with the local devices 10B, 10C, 10D. The exchange 310B, 310C, 310D can include transmitting a motion signature to one or more of the local devices 10B, 10C, 10D and/or receiving a motion signature from the local devices 10B, 10C, 10D. The IES 100A compares motion signature information received during the exchange 310B, 310C, 310D. The comparison of this example results in identification of a matching motion pattern at portable device 10B, where the catching gesture 304 detected by the IES 100B of portable device 10B complements the throwing gesture 302 detected by the IES 100A of portable device 10A. Using information of the identified match, the IES 100A identifies portable device 10B as a bluebump partner.

In addition to identifying portable device 10B as a bluebump partner with which portable device 10A will exchange information, the IES 100A uses information of the detected motion patterns 302 and 304 to determine that contact information will be exchanged. This example assumes contact information stored on the portable devices 10A and 10B is associated with the throwing 302/catching 304 gesture combination, but various other types of information can be associated with the throwing/catching gestures in alternative embodiment or examples. The IES 100A of portable device 10A selects the particular contact information identified for exchange and automatically initiates exchange 320 (transmission) of the selected data to portable device 10B. Likewise, IES 100B of portable device 10B selects particular contact information for exchange and automatically transmits 320 the selected data to portable device 10A.

Following initiation by portable device 10A of exchange of motion pattern information 310B, 310C, 310D with devices 10B, 10C, 10D, the IES 100B, 100C, 100D of the devices 10B, 10C, 10D may also perform comparisons using the received motion signature information. As described above, these comparisons may result in any of the IESs 100B, 100C, 100D identifying matching motion patterns. Thus, using information of the identified match, the IES 100B also may identify portable device 10A as a bluebump partner.

Similarly, in addition to identifying portable device 10A as a bluebump partner with which portable device 10B will exchange information, the IES 100B uses information of the detected motion patterns 302 and 304 to determine that contact information will be exchanged. The IES 100B of portable device 10B therefore selects the particular contact information identified for exchange and may automatically initiate exchange 320 (transmission) of the selected data with portable device 10A.

The IES of an embodiment includes a device comprising at least one of a sensor system that senses motion of the device, and an information exchange system (IES) coupled to the sensor system, wherein the IES identifies motion signatures of the sensed motion, transfers the identified motion signatures between the device and at least one local device, compares the transferred motion signatures to identify corresponding motion signatures of at least one different device, selects data in response to the corresponding motion signatures, and automatically initiates exchange of the selected data between two or more of the devices from which the corresponding motion signatures originated.

The device of an embodiment further comprises a communication system configured to communicate with at least one local device, wherein the communication system is at least one of a wireless communication system, a wired communication system, and a hybrid wireless and wired communication system.

The device of an embodiment further comprises a database coupled to the information exchange system, wherein the database includes information of the motion patterns and the selected data.

The motion signatures of an embodiment each include at least one of timing information and a signal representing the sensed motion.

Transferring the identified motion signatures of an embodiment comprises at least one of transmitting a motion signature and receiving a motion signature.

The IES of an embodiment further associates data stored in a memory with at least one motion signature.

The IES of an embodiment includes a method comprising at least one of detecting motion of a device, identifying a motion pattern that corresponds to the motion, selecting information that corresponds to the identified motion pattern, identifying at least one local device having at least one local motion that corresponds to the identified motion pattern, and exchanging the selected information with the identified local device.

Identifying at least one local device of an embodiment further comprises transmitting a motion signature. The motion signature of an embodiment includes information of the identified motion pattern of the transmitting device, wherein the information of the identified motion pattern comprises at least one of timing information and a description corresponding to the motion. Identifying at least one local device of an embodiment further comprises determining a correspondence between a motion signature of the device and a motion signature of the identified local device. The transmitted motion signature of an embodiment is transmitted to the identified local device.

Identifying at least one local device of an embodiment further comprises receiving a motion signature. The received motion signature of an embodiment is received from the identified local device.

The method of an embodiment further comprises associating information stored at the device with at least one motion pattern.

The motion pattern of an embodiment includes a signal representing at least one of making contact with another device, a gesture through which the device is moved, and tapping of the device.

The exchange of an embodiment is automatic.

The method of an embodiment further comprises providing feedback to a user of the device, the feedback indicating a successful exchange of the selected information.

The IES of an embodiment includes a method comprising at least one of identifying motion patterns that correspond to detected motion of devices, exchanging the identified motion patterns between the devices, comparing the exchanged motion patterns and identifying corresponding motion patterns, selecting data in response to at least one of the identified motion patterns and the identified corresponding motion patterns, and automatically initiating exchange of the selected data between two or more of the devices from which the corresponding motion patterns originated.

Exchanging the identified motion patterns of an embodiment further comprises at least one of transmitting the motion patterns and receiving the motion patterns.

The motion signature of an embodiment includes at least one of timing information and a signal representing the detected motion.

Identifying corresponding motion patterns of an embodiment comprises determining a signal match between a motion pattern of a first device and a motion pattern of a second device.

The method of an embodiment further comprises associating data stored in a memory of at least one of the devices with at least one identified motion pattern.

The IES of an embodiment includes a system comprising at least one of means for identifying motion signatures of devices as associated with at least one gesture performed with the device, means for exchanging the identified motion signatures among the devices and identifying two or more of the devices with matching motion signatures, and means for selecting data in accordance with the identified gesture and automatically initiating exchange of the selected data between the two or more devices.

The system of an embodiment further comprises means for comparing the exchanged motion signatures.

The IES of an embodiment includes machine-readable medium that includes executable instructions, which when executed in a processing system, initiates an automatic exchange of data between two devices by identifying motion signatures of devices as associated with at least one gesture performed with the device, exchanging the identified motion signatures among the devices and identifying two or more of the devices with matching motion signatures, and/or selecting data in accordance with the identified gesture and automatically initiating exchange of the selected data between the two or more devices.

Aspects of the IES described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IES include: microcontrollers with memory (such as electronically erasable programmable read only memory (EEPROM)), embedded microprocessors, firmware, software, etc. Furthermore, aspects of the IES may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described and expressed (or represented) as data and/or instructions embodied in various computer-readable media. Computer-readable media in which such data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the IES is not intended to be exhaustive or to limit the IES to the precise form disclosed. While specific embodiments of, and examples for, the IES are described herein for illustrative purposes, various equivalent modifications are possible within the scope of the IES, as those skilled in the relevant art will recognize. The teachings of the IES provided herein can be applied to other processing systems and methods, not only for the systems and methods described above.

The elements and acts of the various embodiments described above can be combined to provide further embodiments. These and other changes can be made to the IES in light of the above detailed description.

In general, in the following claims, the terms used should not be construed to limit the IES to the specific embodiments disclosed in the specification and the claims, but should be construed to include all processing systems that operate under the claims. Accordingly, the IES is not limited by the disclosure, but instead the scope of the IES is to be determined entirely by the claims.

While certain aspects of the IES are presented below in certain claim forms, the inventors contemplate the various aspects of the IES in any number of claim forms. For example, while only one aspect of the IES is recited as embodied in machine-readable medium, other aspects may likewise be embodied in machine-readable medium. Accordingly, the inventors reserve the right to add additional claims after filing the application to pursue such additional claim forms for other aspects of the IES.

What is claimed is:

1. A device comprising:
a sensor system that senses motion of the device produced by a user of the device making an affirmative gesture using the device to simulate a throwing motion performed by the user of the device;
a data storage storing a plurality of motion signatures, wherein each motion signature includes signal information of a unique pattern of movement over an interval of time and including information identifying data for transfer in a data exchange, and wherein the plurality of motion signatures comprise motion signatures corresponding to a device motion of the device indicating a desire by the user to initiate the data exchange with a compatible local device and motion signatures corresponding to a matching movement of the compatible local device relative to the device indicating a desire to receive the data exchange by a receiving user of the compatible local device;
a first information exchange system (IES) component coupled to the sensor system to detect the presence of the compatible local device within a defined vicinity of the device by wirelessly searching for one or more local devices having the matching movement corresponding to a complementary gesture performed by the receiving user of the compatible local device, wherein the complementary gesture is in a direction at least partially opposite to the affirmative gesture, and simulates a catching motion performed by the receiving user of the compatible local device, wherein the affirmative gesture and the complementary gesture do not involve physical contact between the device and the compatible local device; and
a second IES component coupled to the sensor system, wherein the second IES component identifies a motion signature of the sensed motion, wherein the motion signature comprises a timestamp of the sensed motion and a description of the sensed motion and a description of the matching movement, transfers the identified motion signature to the compatible local device, receives a corresponding motion signature from the compatible local device with the corresponding motion signature comprising a timestamp of the matching movement and a description of the matching movement of the compatible local device, compares the transferred and received motion signatures to identify corresponding motion signatures of the compatible local device as part of a motion signature exchange, selects data in response to the corresponding motion signatures, and automatically initiates exchange of the selected data between the device and the compatible local device to cause the exchange of the selected data.

2. The device of claim 1, further comprising a communication system configured to communicate with the compatible local device, wherein the communication system is at least one of a wireless communication system, a wired communication system, and a hybrid wireless and a wired communication system.

3. The device of claim 1 wherein the data storage is coupled to the first information exchange system and includes a database including information of the motion patterns and the selected data, and storing the plurality of motion signatures in a catalog or group format.

4. The device of claim 1, wherein the motion signature comprises a signal representing the sensed motion, and the corresponding motion signature comprises a signal representing the matching movement of the compatible local device, and wherein the sensed motion is complementary to the motion of the compatible local device.

5. The device of claim 1, wherein the IES further associates data stored in a memory with at least one motion signature.

6. A method comprising:
storing a plurality of motion signatures, wherein each motion signature includes signal information of a unique pattern of movement over an interval of time and including information identifying data for transfer in a data exchange, and wherein the plurality of motion signatures comprise motion signatures corresponding to a device motion of a first device indicating a desire by a user to initiate a data exchange with a local device and motion signatures corresponding to a matching movement of the local device relative to the first device indicating a desire to receive the data exchange by a receiving user of the local device;
detecting a motion associated with a movement of the first device by the user of the first device making an affirmative gesture using the first device to simulate a throwing motion performed by the user of the first device;
automatically detecting the presence of the local device within a defined vicinity of the first device by wirelessly searching for one or more local devices having the matching movement corresponding to a complementary gesture performed by the receiving user of the local device, wherein the complementary gesture is in a direction at least partly opposite to the affirmative gesture and simulates a catching motion performed by the receiving user of the local device, wherein the affirmative gesture and the complementary gesture do not involve physical contact between the device and the local device;
detecting a motion associated with a movement of the local device;
identifying a motion pattern that corresponds to the motion of the first device;
transmitting a motion signature comprising a timestamp of the motion pattern and a description of the detected motion and a description of a matching motion pattern to the local device;
receiving a corresponding motion signature from the local device with the corresponding motion signature comprising a timestamp of the motion of the local device and a description of the motion of the local device;
comparing the transferred and received motion signatures to identify the corresponding motion signatures of the local device including identifying at least two matching motion patterns associated with a movement of the device and the motion of the local device as part of a motion signature exchange; and
exchanging the selected information with the identified local device having the matching movement that corresponds to the movement of the first device, causing the exchanging of the selected information.

7. The method of claim 6, wherein identifying at least one local device further comprises transmitting a motion signature.

8. The method of claim 7, wherein identifying at least one local device further comprises determining a correspondence between a motion signature of the device and a motion signature of the identified local device.

9. The method of claim 7, wherein the transmitted motion signature is transmitted to the identified local device.

10. The method of claim 6, wherein identifying the local device further comprises receiving a motion signature.

11. The method of claim 10, wherein the received motion signature is received from the identified local device.

12. The method of claim 6, further comprising associating information stored at the first device with at least one motion pattern.

13. The method of claim 6 further comprising storing the plurality of motion signatures in a catalog or group format in a database maintained by the device.

14. The method of claim 6, further comprising providing feedback to a user of the first device, the feedback indicating a successful exchange of the selected information.

15. A system comprising:
- means for storing a plurality of motion signatures, wherein each motion signature includes signal information of a unique pattern of movement over an interval of time and including information identifying data for transfer in a data exchange, and wherein the plurality of motion signatures comprise motion signatures corresponding to a device motion of a device indicating a desire by a user to initiate a data exchange with a compatible local device and motion signatures corresponding to a matching movement of the compatible local device relative to the device indicating a desire to receive the data exchange by a receiving user of the compatible local device;
- means for sensing motion of the device produced by the user of the device making an affirmative gesture using the device to simulate a throwing motion performed by the user of the device;
- means for detecting the presence of a compatible local device within a defined vicinity of the device by wirelessly searching for one or more local devices having the matching movement corresponding to a complementary gesture performed by the receiving user of the compatible local device, wherein the complementary gesture is in a direction at least partially opposite to the affirmative gesture and simulates a catching motion performed by the receiving user of the compatible local device, wherein the affirmative gesture and the complementary gesture do not involve physical contact between the device and the compatible local device;
- means for identifying a motion signature of the sensed motion, wherein the motion signature comprises a timestamp of the sensed motion and a description of the sensed motion and a description of the matching movement, transfers the identified motion signature to the compatible local device;
- means for receiving a corresponding motion signature from the compatible local device with the corresponding motion signature comprising a timestamp of the matching movement and a description of the matching movement of the compatible local device; and
- means for comparing the transferred and received motion signatures to identify corresponding motion signatures of the compatible local device as part of a motion signature exchange, selects data in response to the corresponding motion signatures, and automatically initiates exchange of the selected data between the device and the compatible local device to cause the exchange of the selected data.

* * * * *